US006778226B1

(12) United States Patent
Eshelman et al.

(10) Patent No.: US 6,778,226 B1
(45) Date of Patent: Aug. 17, 2004

(54) DEVICE CABINET WITH DYNAMICALLY CONTROLLED APPEARANCE

(75) Inventors: Larry J. Eshelman, Ossining, NY (US); Srinivas Gutta, Buchanan, NY (US); John Milanski, Tarrytown, NY (US); Hugo J. Strubbe, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 168 days.

(21) Appl. No.: 09/686,795

(22) Filed: Oct. 11, 2000

(51) Int. Cl.[7] ............................................... H04N 5/64
(52) U.S. Cl. ......................... 348/836; 348/553; 348/739
(58) Field of Search ................................ 348/836, 839, 348/739, 553, 552; 312/7.2, 223.5, 352; 434/429; 446/14, 13, 73, 76, 81, 175, 484, 491; 463/30, 31, 35; 362/84

(56) References Cited

U.S. PATENT DOCUMENTS

| 4,068,262 A | | 1/1978 | Sandler et al. ................. 358/82 |
| 4,343,032 A | * | 8/1982 | Schwartz ..................... 362/276 |
| 4,591,920 A | | 5/1986 | Yano ........................... 358/250 |
| 4,641,446 A | | 2/1987 | Jackson ....................... 40/444 |
| 4,768,086 A | * | 8/1988 | Paist ............................ 358/81 |
| 5,488,434 A | * | 1/1996 | Jung ........................... 348/602 |
| 5,534,940 A | * | 7/1996 | Sato et al. ................... 348/556 |
| 5,825,347 A | * | 10/1998 | Prinsen ....................... 345/112 |
| 5,848,152 A | * | 12/1998 | Slipy et al. .................. 379/433 |
| 5,917,288 A | * | 6/1999 | Feldman et al. ......... 315/169.3 |
| 6,270,229 B1 | * | 8/2001 | Chien .......................... 362/84 |
| 6,339,429 B1 | * | 1/2002 | Schug ......................... 345/589 |
| 6,611,297 B1 | | 8/2003 | Akashi et al. .............. 348/739 |

FOREIGN PATENT DOCUMENTS

| DE | 19902733 A | 7/2000 | ........... G09F/27/00 |
| WO | WO9712350 | 4/1997 | ............ G09B/9/00 |
| WO | WO0117240 | 8/2001 | ............ H04N/5/64 |

OTHER PUBLICATIONS

Sudravskiy et al.; "Development, Fabrication and Experimental Testing of Construction Principles of Large–Screen Television Systems"; Translation in : Telecommunications and Radio Engineering, part 2, vol. 46, No. 11, pp 50–56, Nov. 1991, (Abstract).

Acker et al.; "Color–Correction Techniques–analog and Digital", SMPTE Journal, vol. 95, No. 3, pp 287–294, Mar. 1986, (Abstract).

Patent Abstracts Of Japan, Tanaka Riichiro, "Television With Exclusive Display Device For Program," Publication No. 59141878, Aug. 14, 1984, Application No. 58015407, Feb. 3, 1983.

Patent Abstracts Of Japan, Kinugawa Kazunao, "El Element And Clock Using This EL Element," Publication No. 05182761, Jul. 23, 1993, Application No. 03344964, Dec. 26, 1991.

\* cited by examiner

Primary Examiner—Victor R. Kostak
(74) Attorney, Agent, or Firm—Gregory L. Throne

(57) ABSTRACT

The appearance of a cabinet for a device (e.g., a television) is dynamically controlled. One way of controlling the appearance of the cabinet is by providing a display panel on the cabinet. At least one input is obtained from an input device and processed by a controller. Based on these inputs, the controller sends signals to the display panel to change the appearance of the display panel. Lamps and heat-sensitive materials may be used to effectuate the desired change in appearance. The cabinet display features may be controlled to give the device the appearance of having a persona or of being an independent animate being. For example, lights in the cabinet could flash to suggest the device is laughing in response to the detection of a laugh track in a sitcom being displayed on the device. Patterns and colors can be generated to reflect moods according to the preferences of an interaction-design programmer.

22 Claims, 4 Drawing Sheets

DEVICE CABINET WITH DYNAMICALLY CONTROLLED APPEARANCE

BACKGROUND OF THE INVENTION

1. Field of the Invention

The invention relates to the provision of dynamic and appealing cabinets and housings for electronic output and interactive devices such as televisions, radios, computers, video games, etc.

2. Background

Many years ago, TV sets were housed in large wooden cabinets that were designed to look like furniture. As time passed, most TV cabinets became less and less ornate, until the look of most modern TV cabinets evolved to resemble a simple black (or charcoal gray) box. Some TV designers have introduced colored models (e.g., silver or white), and some have used sculpted cabinets to distinguish their products from their competitors' products. But no matter what style cabinet is selected by the designer, the appearance of the cabinet remains constant throughout the life of the TV set. This static appearance usually adds little or nothing to the decor of the room where the TV set resides. As a result, many people choose to hide their TV sets from view in entertainment centers and armoires, ironically restoring the TV set to its original furniture-enclosed condition.

Some devices (including, for example, computers and dishwashers) are sold with a plurality of different-colored user-installable panels. The user selects the desired panel, and slides or snaps it into position to change the appearance of the device. While the user can change the appearance of these devices, it is a manual operation that is usually only done once when the device is first installed.

Two unrelated classes of prior art exist. The first unrelated class includes items with non-static appearances that are interesting to watch. Examples of this class include lava lamps (which display slowly moving liquids), mood rings (which change color with temperature), and the devices that draw sparks between an electrode and a glass globe that surrounds the electrode. These devices are perceived, at least by some people, as interesting or beautiful.

The second unrelated class includes virtual pets, such as the Furby™, which is made by Tiger electronics. Furby is a stuffed toy creature that uses sensors to detect external conditions such as sounds, lights, and movement. Furby makes sounds and opens or closes its eyes in response to these external conditions, and is programmed to give the appearance of learning or growing up in response its environment. Another type of virtual pet is the Tamagotchi™, which is a keychain-sized device that includes a microcontroller, a display screen, and some push buttons. The program that runs on the microcontroller implements a "virtual pet" on the display which the user can "feed" or "play with" by pressing the appropriate buttons.

Until now, concepts from the field of virtual pets and from the field of devices with non-static appearances have never been applied in the context of television cabinets (or cabinets for other devices).

SUMMARY OF THE INVENTION

Picture a television set that is alive or has a persona of its own. Think of the television as having a mood and behavior, like a person or a simulated automaton. Television sets are becoming increasingly smart and interactive, so the idea of a television as being separate animate entity, in some sense, is already a familiar notion. But how would an animated television "behave" to reflect its mood and to give it "life?" According to the invention, the cabinet itself may be animated using static or dynamic light, color, patterns, sound effects, etc. For example, instead of building televisions with plain fixed housings, the housing could incorporate materials or devices that allow the color of the cabinet to change in response to a control signal from a controller. If the television has been showing a comedy and the controller could classify real-time features of comedy shows (such as laugh-tracks), the controller could change the appearance of the cabinet to reflect the instantaneous mood of the programming; in this example by temporarily changing to a light, bright color, or rapidly-changing light patterns. For another example, if the television is being used to display a children's show, the cabinet could display continuously-varying color schemes and patterns, that change in response to the action in the children's show.

The cabinet need not change to reflect only the "mood" of, or responses to, a currently displayed program. It could also reflect a persistent mood that is responsive to the recent history of programs displayed on it. So if the last three programs watched have been children's cartoons, the cabinet might have a more light-hearted appearance than if the television had been used to watch war documentaries. Also, the controller may be configured to respond to its environment, not just television programming. For example, it could brighten its color when a person turns on a light in the room.

One aspect of the present invention relates to a television set that includes a cabinet, a display device affixed to the cabinet, and video circuitry that controls the display device so that a video portion of a program is displayed. The television set also includes a display panel that is affixed to the cabinet, an input device, and a controller. The display panel has a controllable appearance that depends on a first input. Based on an input accepted by the input device, the controller selects an appearance for the display panel and generates an output signal corresponding to the selected appearance. This output signal is provided to the first input of the display panel.

Another aspect of the present invention relates to a television set that includes a cabinet, a television display device integrated into the cabinet, and control circuitry that controls the television display device so that a video portion of a program is displayed. The television set also includes an auxiliary display device that is affixed to the cabinet, an input device, and a controller. The auxiliary display device has a first input. The appearance of the auxiliary display device depends on this first input. Based on an input indication accepted by the input device, the controller selects an appearance for the auxiliary display device and generates an output signal corresponding to the selected appearance. This output signal is provided to the first input of auxiliary display device.

Another aspect of the present invention relates to a method of changing an appearance of a device. In this method, the device is housed in a cabinet with a controllable appearance. An input is obtained, and an appearance of the cabinet is controlled based on the obtained input.

DETAILED DESCRIPTION OF THE PREFERRED EMBODIMENTS

Figure 1:
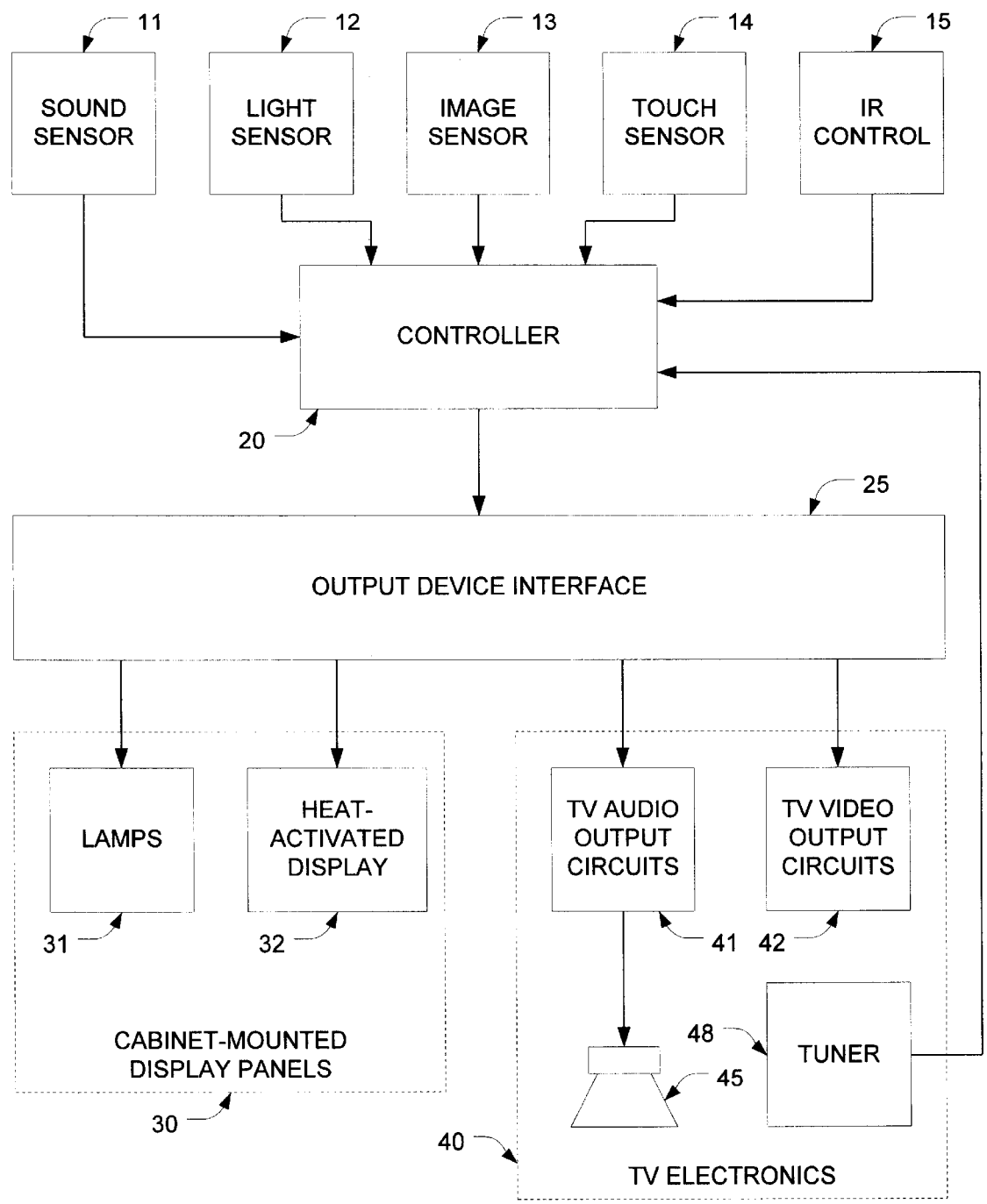
FIG. 1 is a hardware block diagram used in an embodiment of the present invention.
Figure 2:
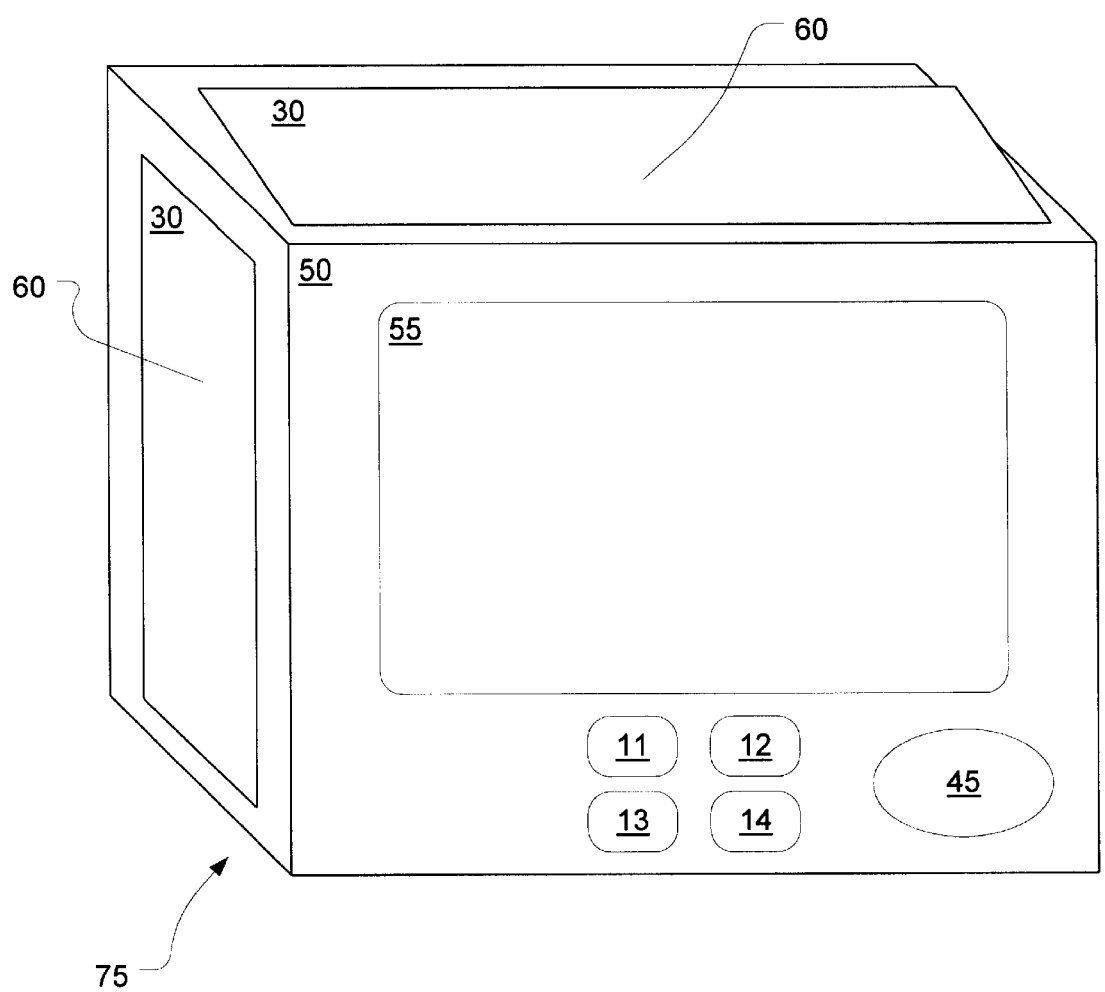
FIG. 2 is a schematic illustration of a television with display panels that are controlled by the hardware shown in FIG. 1.

Referring to FIGS. 1 and 2, in an embodiment of the present invention, operations are controlled by a controller 20. Preferably, the controller 20 is implemented using a microprocessor or a microcontroller that runs a control program to implement processes described further below. (See the discussion of FIG. 3.) The control program may be stored in any suitable memory media including, for example, solid state devices (e.g. RAM, ROM, EPROM), and magnetic media.

The controller 20 receives inputs from one or more input devices 11–15. In the FIG. 1 embodiment, five input devices 11–15 are depicted to illustrate the idea, but the group is by no means limiting. The example input devices 11–15 are a sound sensor 11, a light sensor 12, an image sensor 13, a touch sensor 14, and an infrared (IR) control 15. These input devices 11–15 enable the controller 20 to respond to the environment in which the device is being used.

The sound sensor 11 enables the controller to sense sounds in the vicinity of the device. Examples of suitable devices for sound sensor 11 include dynamic microphones and electret microphones, which generate an electrical signal that depends on detected sounds. Optionally, the sound sensor 11 may be positioned to receive sounds that are generated by a speaker 45 of a TV 75, so that the sound produced by the TV 75 can be sensed by the controller 20. In an alternative embodiment, a signal from a TV audio output circuit 41 may be subtracted from the signal detected by the sound sensor 11, so that sound generated by the speakers 45 will be ignored.

The light sensor 12 enables the controller 20 to determine when lighting conditions in the device's environment have changed. Examples of suitable devices for the light sensor 12 include photodiodes and photocells that respond to visible or infrared light. The light sensor 12 generates an output signal that depends on the amount of light arriving at the device.

The image sensor 13 responds to detected images of objects in the field of view of the device. Examples of suitable devices for the image sensor 13 include charged-coupled devices and active-pixel CMOS devices. Alternative devices that can distinguish between different objects based on sight may also be substituted therefore. In addition to an image sensing element itself, each image sensor 13 preferably includes suitable optics (e.g. lenses and/or mirrors) to capture the relevant images.

The touch sensor 14 enables the controller 20 to determine when the device has been touched. Examples of suitable devices for the touch sensor 14 include push button switches, touch screens that operate by detecting changes in capacitance or resistance, infrared heat detectors that detect warmth from a human body, piezoelectric transducers that detect changes in pressure, and other types of touch-sensitive technology.

The IR control 15 transmits and accepts infrared command codes from a remote transmitter (not shown) and forwards those codes to the controller 20. Preferably, the IR control 15 is implemented using a standard IR interface protocol (e.g. IrDA, or it could be an RF-based system such as Bluetooth®) that enables the controller 20 to determine when keys on the remote transmitter have been pressed.

Suitable interface circuitry (not shown) may enable each of these input devices 11–15 to communicate with the controller 20. The design of such interface circuitry will depend on the particular type of sensor device that has been selected. The interface circuitry may be designed using any of a variety well known techniques for the sensor device in question (e.g., preamplifiers for microphones, transconductance amplifiers for photodiodes, etc.). Thus, this aspect of the technology need not be discussed further.

In alternative embodiments, a different number of input devices including or not including input devices 11–15 are provided. One or more of the illustrated input devices 11–15 may be omitted or replaced with alternative sensors. For example, a proximity sensor (not shown) could be used to determine if a person is present. In a less preferred alternative embodiment, no input devices are provided, and the controller 20 bases its control decisions on internally determined conditions (e.g. based on time, based on a random event generator, or media signals from, for example, a tuner 48, etc.)

Preferably, an event detection process is implemented for each of the input devices 11–15 to detect when particular events have occurred based on signals received from each of the input devices 11–15. The event detection process may be implemented in hardware (e.g., using appropriate digital or analog hardware to process the signal from the sensor) and/or in software (e.g., by a program running on the controller 20 or in an additional signal processor (not shown).

When event detection is implemented in hardware, the interfaces between each of the event detectors and the controller 20 may be accomplished by providing a dedicated signal line that is asserted when an event is detected. Alternatively, appropriate digital data may be transmitted over a data bus in response to a detection of an event or a polling scheme may be used. When event detection is implemented in software, a raw digitized signal from the corresponding sensor is provided directly to the controller 20.

In the context of the sound sensor 11, the event detection process may monitor an audio signal detected by the sound sensor 11 (e.g., a microphone) and classify the audio signal, for example, by comparing that signal to predetermined patterns that correspond to recognizable events. Alternatively, classification may be done by Bayesian, neural network, or any other suitable technique, the particulars of the chosen technique not being important for purposes of describing the invention. For example, if a sudden loud noise is defined as an event, the circuitry could generate a SUDDEN-NOISE signal when the amplitude of the audio signal increases suddenly. Or, if a human scream is defined as an event, the circuitry could generate a SCREAM signal when the characteristics of the audio signal match a stored pattern for a scream. Numerous other examples of audio events can be readily envisioned including, for example, detecting the sounds of laughter, rain, party noises, etc. Detecting when these events have occurred may be implemented using any detection technique that is suited to the particular sound including, e.g., filters, discriminators, envelope detectors, etc. As mentioned, the classification may be done by more sophisticated techniques such as Bayesian or neural network, genetic algorithm, classifiers or any other machine-based pattern-recognition technique. Such techniques may be implemented in the analog or digital domain.

Preferably, analogous event detection processes are also implemented for the other sensors 12–15. Examples of detectable events for the light sensor 12 include changes from bright to dim light or dim to bright light, continuous or random flashing, gradual changes in illumination, color, etc. Examples of detectable events for the image sensor 13 include motion in the field of view of the image sensor 13, presence of one or more human faces in the field of view of the image sensor 13, a dominant color in a scene, etc. Examples of detectable events for the touch sensor 14 include a light touch and a hard press, etc.

Optionally, similar event detection may also be implemented for audio and/or video signals generated by the tuner 48, which is preferably the same used to receive the program being watched on the TV 75 (but may also be an auxiliary tuner). Events may be defined for recognized video signals, audio signals, or combinations thereof. For example, the audio signal may include a laugh track such as used in sitcoms and this may be recognized and responded to as an event.

The controller 20 collects input from all of the input devices 11–15 described above (e.g., as raw data from the corresponding sensor, or preprocessed signals from an event detection process, as described above). The controller 20 then controls the appearance of the device by controlling the state of cabinet-mounted display panels 30, as described below in connection with FIG. 3.

At least one display panel 30 is incorporated into the device, and these display panels 30 may be implemented using a variety of different technologies. Preferably, the area of the display panels 30 is relatively large (e.g., occupying at least 25% of the visible area of the cabinet).

In one embodiment, the display panels 30 are implemented using lamps 31, and the appearance of the display panel 30 is changed by controlling the brightness of these lamps 31. Optionally, the lamps 31 may be variously colored so that both the color and brightness of the display panels 30 can be controlled by suitably adjusting the brightness of the lamps 31. These lamps 31 may be implemented by using any of a variety of light emitting technologies including, for example, incandescent lamps, florescent lamps, and light emitting diodes (LEDS). (Examples not shown.) In one preferred embodiment, each display panel 30 includes a light diffusing panel 60 and a plurality of different colored lamps mounted behind the light diffusing panel 60 and positioned to illuminate the light diffusing panel 60.

The output device interface 25 contains circuitry that interfaces with the display panel 30. Optionally, the output device interface 25 may be integrated into the same physical package as either the controller 20 or the display panel 30. In the above-described example (where the display panels 30 are implemented using lamps 31), the output device interface 25 would be configured to drive the particular lamp used in the display panel 30. For example, when LEDS are used in the display panel 30, the output device interface 25 would be implemented using transistors, or when florescent lamps are used in the display panel 30, the output device interface 25 would be implemented using a suitable transformer and ballast arrangement (not shown). Details of implementing the conventional aspects of the output device interface 25 to drive the lamps 31 are well known and any conventional lamp-driving technique may be used.

In an alternative embodiment, the display panels 30 employ a heat-activated display 32 (e.g., a liquid crystal material). A heating portion (not shown separately) of the heat-activated display 32 may be a heating element (also not shown separately) embedded in a heat-sensitive material portion (also not shown separately) of the heat-activated display 32. When the heat-sensitive material portion is unheated, the heat-activated display 32 will display a color that corresponds to the ambient temperature. When heat is applied, the color of the heat-sensitive material portion of the heat-activated display 32 will change. Preferably, the heat-sensitive material portion has a range of different colors. The color of the display panels 30 can then be controlled by controlling heating power.

In the heat-activated display 32 embodiment, the output device interface 25 controls the appearance of the display panel 30 by controlling the heat output rate. This may be accomplished e.g., by adjusting the voltage or duty cycle of the heating portion (e.g., heating element). Optionally, a temperature detecting device (not shown) may be used to measure the ambient temperature. The amount of applied heat can then be adjusted accordingly to obtain the desired color using a lookup table (LUT) or formula that indicates the heating rate required to achieve a particular color at a given ambient temperature. The latter may be programmed into the controller 20 or the output device interface 25. Optionally, a temperature sensor (not shown) may be embedded within the heat-activated display 32 itself, so that the actual temperature of the heat-activated display 32 can be measured. Appropriate adjustments can then be made based on feedback from the temperature sensor.

Other types of display panels 30 may also be used instead of the lamp-based and heat-based technologies described above, as long as a matching output device interface 25 is provided. Also, other types of visual or other output devices are within the scope of the invention. Lights could be incorporated on the outside of the TV 75 cabinet 50 or as a module device that projects light from behind or beneath the TV 75. As in the principal embodiment, the lights may create patterns in a manner similar to automated stage lighting or disco lights. Pattern masks may be used to project patterns on walls or on the TV 75 cabinet 50 responsively to the same control signals as discussed above and below.

While the present invention may be implemented in any type of device, an exemplary and preferred implementation is as the cabinet 50 of the TV 75 that includes TV electronics 40 including TV audio output circuits 41 and TV video output circuits 42. Optionally, the controller 20 may interface with the TV audio output circuits 41 via the output device interface 25. When this option is implemented, the controller 20 sends signals to the TV audio output circuits 41 via the output device interface 25. These signals cause the TV audio output circuits 41 to modify the sounds being sent to speakers 45. Examples of audio modifications include: changing the tone, volume, or equalization settings of the sound or adding sound effects like hiss, crackle, and/or sound samples in lieu of, or on top of, the sound ordinarily issuing from the TV audio output circuits 41.

Optionally, the controller 20 may interface with the TV video output circuits 42 via the output device interface 25. When this option is implemented, the controller 20 sends signals to the TV video output circuits 42 via the output device interface 25. These signals modify the video image being displayed on the television screen 55 (shown in FIG. 2). Examples of video modifications include changing the brightness, color, tint, position, or size of the image on the screen; adding snow, stripes, or zigzags; or distorting the image to create image morphs, animation in superposition, etc. to the image being displayed.

When audio and/or video signals from the tuner 48 are applied to the controller 20, it can detect the occurrence of certain events in the program being watched on the TV 75 (using, e.g., event-detection techniques similar to those described above in connection with the sound sensor 11 and image sensor 13). The controller 20 can then control the appearance of the display panels 30 based on the detected events. When optional control of the TV audio output circuits 41 and TV video output circuits 42 is implemented, the controller 20 can also control the audio and video output of the TV 75 based on events detected from the audio and/or video signals from the tuner 48. Thus, for example, when a laugh track is identified in the audio signal, the audio and/or video output could be modified or the display panels 30 activated to create some effect.

While the device illustrated in FIG. 2 is the TV 75, it should be noted that the present invention may also be implemented in other devices (including, for example, audio equipment, appliances, computers, etc.). The illustrated TV 75 includes a cabinet 50. The display panels 30 are affixed to the cabinet 50. The display panels 30 may optionally be mounted so that their surfaces are flush with a surface of the cabinet 50, as illustrated on the left side of the cabinet 50. Alternatively, the display panels 30 may be mounted so that they protrude above the surface of the cabinet, as illustrated at the top of the cabinet 50. The display panels 30 may be affixed to the cabinet 50 in numerous ways. For example, they may be affixed directly to the cabinet 50, or indirectly through intermediate members (not shown); and may be mounted over a solid portion of the cabinet 50, or over a cutout (not shown separately) in the cabinet 50. The display panels 30 may be formed in any shape including, for example, flat, contoured, curved to conform to the cabinet, etc. While the illustrated embodiment includes two display panels 30, any number of display panels 30 may be integrated into the cabinet 50.

A television screen 55 is housed in the cabinet 50 and mounted using any conventional technique so that the television screen 55 is visible. Any suitable television display device may be used for the television screen 55, for example, cathode-ray tubes and liquid crystal display panels. Appropriate circuitry (not shown) is provided to control the television screen 55 in order to produce a video image on the television screen 55. This circuitry may be implemented using any conventional technique, depending on the particular technology selected for the television screen 55. With certain display device technologies such as active matrix thin film transistor screens, the video circuitry may be integrated into the television screen 55 itself. Preferably, this video circuitry reacts to a video signal received, or derived, from any suitable source (e.g. from a cable or RF broadcast, VCR, DVD player, etc.).

Input devices 11–14 and speaker 45 are preferably integrated into the cabinet 50. The controller 20 and the output device interface 25 (shown in FIG. 1) that control the display panels 30 are also, preferably, housed within the cabinet 50.

Figure 3:
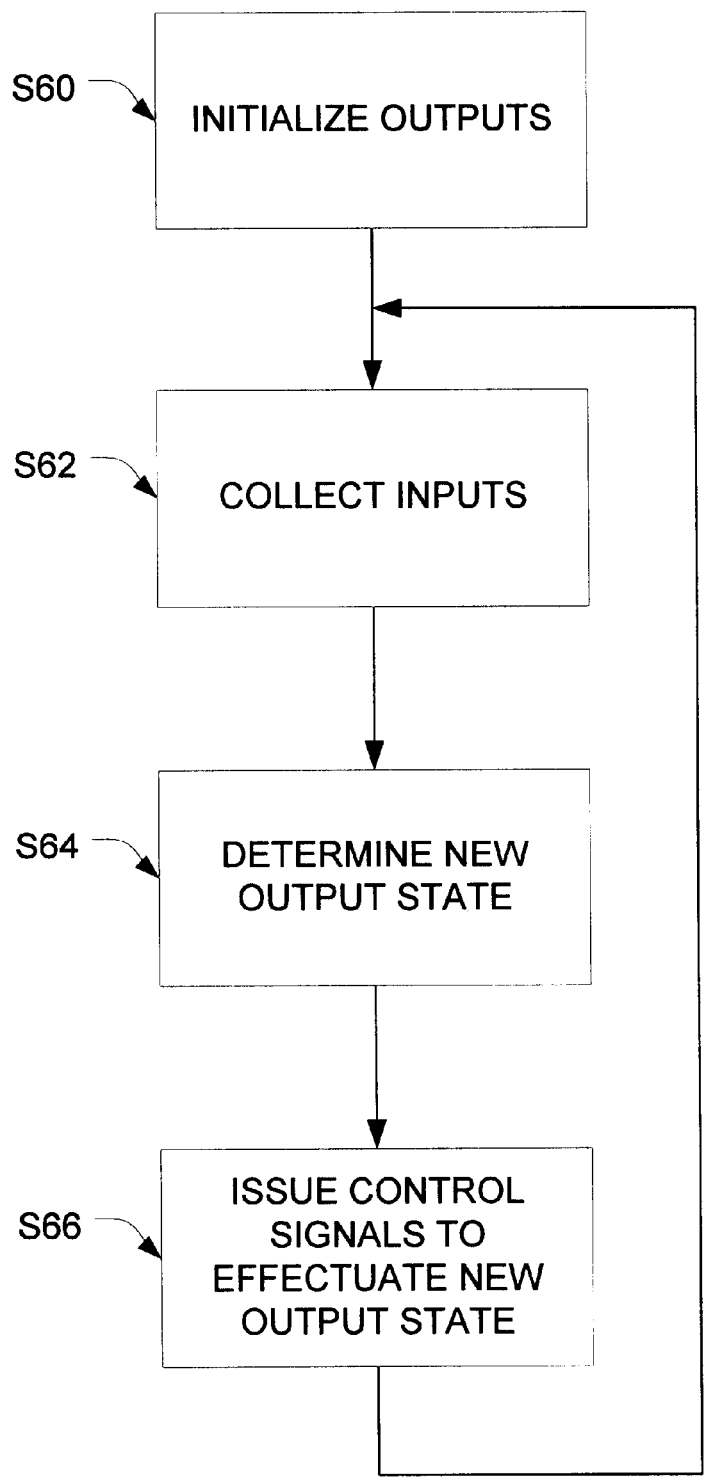
FIG. 3 is a flowchart of the processes implemented in the controller 20 shown in FIG. 1.

FIG. 3 is a flowchart of the processes implemented in the controller 20, and is best understood when viewed together with the block diagram of FIG. 1. When power to the TV electronics 40 is first turned on, the output state is initialized in step S60 by sending appropriate commands to the output device interface 25. The output state may be set to a default condition (e.g. with the lamps 31 or heater in the display panel 30 turned off). Alternatively, when a non-volatile memory is available, the output state that was in effect when the TV 75 was last used may be restored in state S60.

In step S62, the controller 20 collects inputs from all of the input devices 11–15 and tuner 48. When event detection is implemented in hardware (as described above), this step includes accepting inputs from hardware event detectors (not shown) corresponding to each of the input devices 11–15. When event detection is implemented in software within the controller 20 itself, this step includes measuring signals from each of the input devices 11–15, and processing these signals to determine when an event has occurred.

In step S64, a new output state for the display panel 30 is determined based on the inputs collected in step S62. In one embodiment, the new output state is determined by referencing a suitably programmed LUT that specifies an output state for each possible combination of input states. Table 1 is an example of such a LUT that may be used in systems with lamp-based display panels 30, based on input events detected by the sound sensor 11. In this embodiment, the new output state depends only on the detected input event. Note that in these tables, lower case colors denote dimly lit lamps 31, and upper case colors denote brightly lit lamps 31.

TABLE 1

| detected input event | new output state |
| --- | --- |
| sudden noise | RED |
| soft music | red |
| quiet | green |
| laugh | GREEN |
| party sounds | YELLOW |

In an alternative embodiment, the LUT may be programmed so that the new output state also depends on the existing output state. Table 2 is an example of a suitable lookup table for a system that responds to input events detected by the sound sensor 11. The new output state depends on both the detected input events and the old output state. For example, if the old output state is "RED", and a laugh is detected, the new output state specified in the Table 2 LUT would be "green". Or if the old output state is "green", and a laugh is detected, the new output state specified in the Table 2 LUT would be "GREEN".

TABLE 2

| old output state | sudden noise | soft music | quiet | laugh | party sounds |
| --- | --- | --- | --- | --- | --- |
| RED | red | red | red | green | YELLOW |
| red | RED | red | red | green | YELLOW |
| GREEN | RED | yellow | green | green | YELLOW |
| green | RED | yellow | green | GREEN | YELLOW |
| YELLOW | YELLOW | yellow | yellow | GREEN | yellow |
| yellow | YELLOW | yellow | yellow | GREEN | YELLOW |

When a different set of audio events is detected, suitable modifications to the tables should be made. Similarly, when event detection is implemented for the other sensors 12–15 (instead of, or in addition to, the audio event detection described above), suitable modifications to the tables should be made, as will be appreciated by persons skilled in the art.

When the optional control of the TV audio and video output circuits 41, 42 is implemented, a desired output state for the TV audio and video output circuits 41, 42 is also determined in step S64 in a manner similar to the output state determination made for the display panel 30.

In alternative embodiments, techniques from the field of virtual pets may be relied upon in order to determine the new output state for the display panels 30. When such techniques are used, the display panels 30 on the TV 75 may be programmed to exhibit a virtual "personality" or "mood" (e.g. depressed, lonely, etc.) based on a history of detected events observed by the system. Optionally, this "mood" may be programmed to respond to the shows being watched on the TV 75 itself (based, e.g., on signals provided by the tuner 48 to the controller 20). Similar virtual pet techniques may also be used to control the TV audio and video output circuits 41, 42.

Optionally, a manual override that enables a user to manually control the state of the display panels 30 and/or the TV audio and video output circuits 41, 42 may be implemented. Preferably, manual override is implemented via the IR control 15, which enables a user to input control functions conveniently. This type of manual override may be used, for example, to set the appearance of the display panel 30 to match a decor of a room.

In step S66, the controller 20 issues control signals in order to set the display panel 30 to the output state that was determined in step S64. These signals are provided to the output device interface 25, which generates the appropriate driving signals to set the display panels 30 to the desired output state. When the optional control of the TV audio and video output circuits 41, 42 is implemented, the controller 20 also generates appropriate control signals in step S66 to control the TV audio and video output circuits 41, 42.

As mentioned above, the control of the display panels or other output devices may be designed around the focus of giving the corresponding appliance (e.g., the TV 75 with its cabinet 50) the appearance of an intelligent persona. When something funny happens in a program or the user does something, the TV 75 responds. If the TV 75 controller 20 is programmed to generate speech or text output using, for example, a conversation simulator program, the TV 75 could, via its effects, add a kind of body language to its speech. For example, the cabinet 50 could pulsate with light as the TV 75 "spoke." The intensity of the light could correspond to the emotional tone of the speech. The TV 75 could "laugh" along with a laugh track output by the TV audio output circuits 41 by generating color bursts synchronized to some sound effect that is selected to represent the laughter of the TV 75. The latter could be a human laugh sample altered to sound mechanical or robotic. The TV 75 could pulsate with light when someone enters its proximity to suggest it is beckoning to be interacted with. Many different possibilities fall within the scope of the invention.

When the above-described embodiments are incorporated into a portable TV 75 (not shown as a separate embodiment), the portable TV 75 may be used as a viewing companion to provide an illusion that the portable TV 75 is watching another traditional TV together with the viewer.

Figure 4:
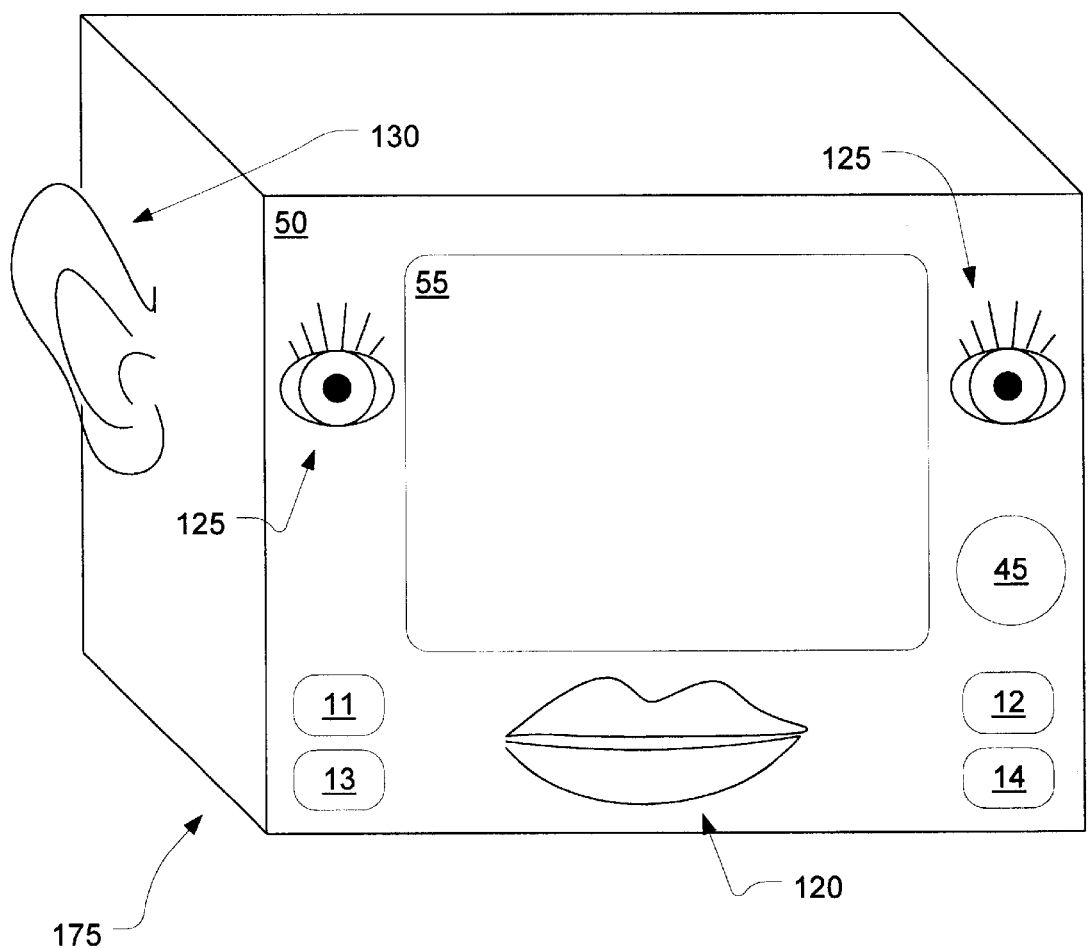
FIG. 4 is a figurative illustration of an alternate embodiment of the invention in which articulatable components are provided to generate an appearance of a television that is alive.

While the present invention has been explained in the context of the preferred embodiments described above, it is to be understood that various changes may be made to those embodiments, and various equivalents may be substituted, without departing from the spirit or scope of the invention, as will be apparent to persons skilled in the relevant art. For example, mechanical parts of the television housing or cabinet can be made to move as well as light up or change color in response to the video signal. Referring to FIG. 4, for example, a cabinet 175 can be provided specifically for the purpose of giving the television an impression of being alive. It could have eyes 125 that open and close, ears 130 that wiggle, a mouth 120 that moves in synchrony with speech. These features may be built into the cabinet 175. The features may be articulated like those of a doll like Furby®. Also light and color-driven articulations or mechanical articulations can be incorporated in the remote control (not shown) as well as the television cabinet. Thus according to further embodiments all the discussion relative to the control of the cabinet may apply to the control of a remote to make it expressive in the same manner. Thus, such a control may include mechanical elements like Furby® or may have lights or displays like the cabinet 50 of the television.

What is claimed is:

1. A television set comprising:
   a cabinet;
   a television display device having a viewing screen, said television display device being affixed to said cabinet so that said viewing screen is visible to a user;
   video circuitry that, responsively to a program signal, controls said television display device so that a video portion of a program is displayed on said viewing screen;
   a display panel affixed to said cabinet at a visible location, said display panel having a controllable appearance that depends on a control input;
   an input device that accepts at least one input;
   a controller programmed to detect a characteristic of an environment responsively to said input accepted by said input device, selects an appearance for said display panel and generates an output signal corresponding to said selected appearance, wherein said output signal is provided to said control input of said display panel and said selection of said appearance of said display panel is also responsive to a characteristic of said video portion of said program.

2. The television set of claim 1, wherein said display panel has a visible area and said cabinet has a visible area, and said visible area of said display panel is at least a substantial fraction of said visible area of said cabinet.

3. The television set of claim 1, wherein said display panel comprises a light source, and wherein a brightness of said light source is controlled in response to changes in said control input.

4. The television set of claim 1, wherein said display panel comprises a plurality of light sources having different colors, and wherein different subsets of said plurality of light sources are illuminated in response to changes in said control input.

5. The television set of claim 1, wherein said display panel comprises:
   a light diffusing panel; and
   a plurality of light sources having different colors mounted behind said light diffusing panel and positioned to illuminate said light diffusing panel,
   wherein different subsets of said plurality of light sources are illuminated in response to changes in said control input.

6. The television set of claim 1, wherein said display panel comprises a material with a color that changes with temperature, and a heating element in thermal contact with said material, and wherein an amount of heat generated by said heating element is controlled by said control input.

7. The television set of claim 1, wherein said input device comprises a microphone.

8. The television set of claim 1, wherein said input device comprises a light sensor.

9. The television set of claim 1, wherein said input device comprises an image sensor.

10. The television set of claim 1, wherein said input device comprises a touch sensor.

11. The television set of claim 1, wherein said input device comprises an infrared code receiver.

12. The television set of claim 1, wherein said input device comprises a media signal device generating a media signal including at least one of video and audio data.

13. The television set of claim 1, wherein said selection of said appearance of said display panel is also responsively to a characteristic of an audio portion of said program.

14. A television set comprising:

a cabinet;

a television display device affixed to said cabinet in a position that permits viewing of said television display device by a user;

control circuitry that causes said television display device to display a video portion of a program;

an auxiliary display device integrated into said cabinet in a position that permits viewing of said auxiliary display device by a viewer, said auxiliary display device having a display input, said auxiliary display device having an appearance that depends on said display input, said auxiliary display device including eyes operable for opening and closing, ears operable for wiggling, and a mouth that moves in synchrony with speech;

an input device that accepts at least one input; and a controller that, responsively to said input accepted by said inputs(s) accepted by said input device, selects an appearance for said auxiliary display device and generates an output signal corresponding to said selected appearance, wherein said output signal is provided to said display input of said auxiliary display device for desired operation of the eyes, ears, and mouth.

15. A method of changing an appearance of a device having a viewing screen for displaying a video portion of a program, said method comprising:

housing said device in a cabinet with a controllable appearance;

obtaining at least one input;

controlling an appearance of said cabinet responsively to said at least one input obtained in said obtaining step wherein said controlling of said appearance of said cabinet is also responsive to a characteristic of the video portion of said program, wherein said step of providing a cabinet with a controllable appearance comprises said step of providing a cabinet with a color that changes in response to a control signal, and wherein said step of controlling an appearance of said cabinet comprises said step of controlling said control signal responsively to said input obtained in said obtaining step.

16. The method of claim 15, wherein said device comprises a television.

17. The method of claim 15, wherein said step of obtaining an input comprises said step of detecting sound waves arriving at said device.

18. The method of claim 15, wherein said step of obtaining an input comprises said step of detecting an image arriving at said device.

19. The method of claim 15, wherein said step of controlling an appearance of said cabinet comprises said step of turning on selected light sources in response to said control signal.

20. The method of claim 19, wherein said step of controlling an appearance of said cabinet comprises said step of heating a material with a color that is temperature-dependant in response to said control signal.

21. The method of claim 15, wherein said step of controlling an appearance of said cabinet includes reflecting light from said cabinet.

22. A television set comprising:

a cabinet;

a television display device having a viewing screen, said television display device being affixed to said cabinet so that said viewing screen is visible to a user;

video circuitry that, responsively to a program signal, controls said television display device so that a video portion of a program is displayed on said viewing screen;

a display panel affixed to said cabinet at a visible location, said display panel having a controllable appearance that depends on a control input;

an input device that accepts at least one input, said input device comprises a media signal device generating a media signal including at least one of video and audio data;

a controller programmed to detect a characteristic of an environment responsively to said input accepted by said input device, selects an appearance for said display panel, and generates an output signal corresponding to said selected appearance, wherein said output signal is provided to said control input of said display panel.

* * * * *